(12) United States Patent
Masuda

(10) Patent No.: US 7,013,126 B2
(45) Date of Patent: Mar. 14, 2006

(54) COMMUNICATION SYSTEM

(75) Inventor: Hiroyo Masuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 433 days.

(21) Appl. No.: 10/109,347

(22) Filed: Mar. 28, 2002

(65) Prior Publication Data

US 2003/0078031 A1 Apr. 24, 2003

(30) Foreign Application Priority Data

Oct. 19, 2001 (JP) ............................. 2001-321376

(51) Int. Cl.
*H04M 11/00* (2006.01)
(52) U.S. Cl. .................... 455/406; 455/407; 379/114.2
(58) Field of Classification Search ........ 455/405–411; 379/114.15–114.26, 133–134, 144.01
See application file for complete search history.

(56) References Cited

U.S. PATENT DOCUMENTS

| | | | |
|---|---|---|---|
| 6,188,752 B1 * | 2/2001 | Lesley ................... | 379/114.16 |
| 6,529,593 B1 * | 3/2003 | Nelson ................... | 379/114.2 |
| 6,731,740 B1 * | 5/2004 | Choudhury et al. ... | 379/221.03 |
| 6,741,686 B1 * | 5/2004 | Bekkevold et al. ...... | 379/114.2 |
| 2001/0025275 A1 * | 9/2001 | Tanaka et al. .............. | 705/412 |
| 2002/0103879 A1 * | 8/2002 | Mondragon ................ | 709/218 |
| 2003/0101135 A1 * | 5/2003 | Myatt et al. .................. | 705/40 |

FOREIGN PATENT DOCUMENTS

| | | |
|---|---|---|
| JP | 02122397 | 5/1990 |
| JP | 09224103 | 8/1997 |
| JP | 09312708 | 12/1997 |
| JP | 10200962 | 7/1998 |
| JP | 2000-032145 | 1/2000 |
| JP | 2000-115253 | 4/2000 |
| JP | 2000-232520 | 8/2000 |
| JP | 2000-236353 | 8/2000 |

* cited by examiner

*Primary Examiner*—Duc Nguyen
(74) *Attorney, Agent, or Firm*—Katten Muchin Rosenman LLP

(57) ABSTRACT

A communication system capable of conducting efficient multi prepaid service and also improving the quality and convenience of prepaid communication service. Service request transmitting section transmits a service request for a prepaid service, and prepaid service executing section executes the prepaid service. Registration information transmitting section transmits registration information for executing the prepaid service. User request receiving section receives the service request and the registration information. Based on the service request and the registration information, prepayment control section performs prepayment control including a process of allotting the balance of prepayment to a plurality of prepaid services to be conducted simultaneously. Prepaid service providing section provides the prepaid service in accordance with the corresponding allotment of the balance.

3 Claims, 20 Drawing Sheets

Seq. 10

COMMUNICATION SYSTEM

BACKGROUND OF THE INVENTION

1. Field of the Invention

The present invention relates to a communication system, and more particularly, to a communication system for providing prepaid communication service over network.

2. Description of the Related Art

Among a diversity of recent communication services, prepaid services have become widespread. Prepaid portable telephone is an example of voice communication-related prepaid service. To use a prepaid portable telephone, a fixed amount of money needs to be paid in advance, and when the charge for calls reaches the amount paid, the portable telephone permits no further calls. This type of portable telephone is widely used by underage people as a precaution against overuse as well as by people who find the basic charge too expensive because of infrequent use.

Also, service called BitCash is an example of prepaid service on the Internet that takes charge of accounting of Web pages, selling of image data, etc. To use this service, the user first buys a prepaid card at a store and scratches a silver film of the card to expose a password hidden thereunder. When utilizing a service of a member store, the user has only to enter the password. The user can enjoy services until the balance of the prepaid card comes to zero.

Meanwhile, services based on IMT-2000, whose standardization had been aimed to be completed in the year 2000, will be launched as next-generation mobile communication services. IMT-2000 is multimedia mobile communication system capable of communications using a maximum of 2 GHz band as determined by the ITU.

With the provision of IMT-2000 services, the function of mobile telephone is expected to be enhanced such that while making a telephone call, the user can access a website on the Internet or download motion picture content, thus widening the application of mobile telephone.

However, in conventional communication systems for providing prepaid services such as those described above, control performed permits only the situation where the user receives a single prepaid service at a time. No efficient control procedure has been established yet for the user's multi-call to prepaid services (simultaneous access calls to multiple prepaid services).

Let it be assumed, for example, that with a portable telephone connected to a personal computer, the user makes a telephone call over a voice network and then wishes to download content on the Internet over a packet network, by utilizing prepaid service provided by a carrier A.

In such cases, since multi-call is not taken account of on the part of the server, all of the balance of prepayment is reserved for the first-requested telephone service via the voice network.

Accordingly, although a request is received thereafter from the packet network, it is not possible to provide a prepaid service over the packet network (there is no control procedure for appropriating the user's balance to another prepaid service provided by the carrier A, and moreover, the manner of how the balance is to be allotted to a plurality of prepaid services is not established).

Thus, the conventional prepaid services are unable to cope with forthcoming multimedia mobile communication environments such as IMT-2000. Accordingly, there has been a strong demand for a prepaid service system which permits the user to start a plurality of prepaid services at the same time and thus can provide high-quality services.

SUMMARY OF THE INVENTION

The present invention was created in view of the above circumstances, and an object thereof is to provide a communication system which is capable of providing efficient multi prepaid services and thus enhancing the quality and convenience of prepaid communication services.

To achieve the above object, there is provided a communication system for providing prepaid communication service over a network. The communication system comprises a user terminal device which includes service request transmitting means for transmitting a service request for a prepaid service, prepaid service executing means for executing the prepaid service and registration information transmitting means for transmitting registration information for executing the prepaid service, and a prepayment control device which includes user request receiving means for receiving the service request and the registration information, prepayment control means for performing prepayment control including a process of allotting a balance of prepayment to a plurality of the prepaid services to be conducted simultaneously, based on the service request and the registration information, and prepaid service providing means for providing the prepaid service in accordance with a corresponding allotment of the balance.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
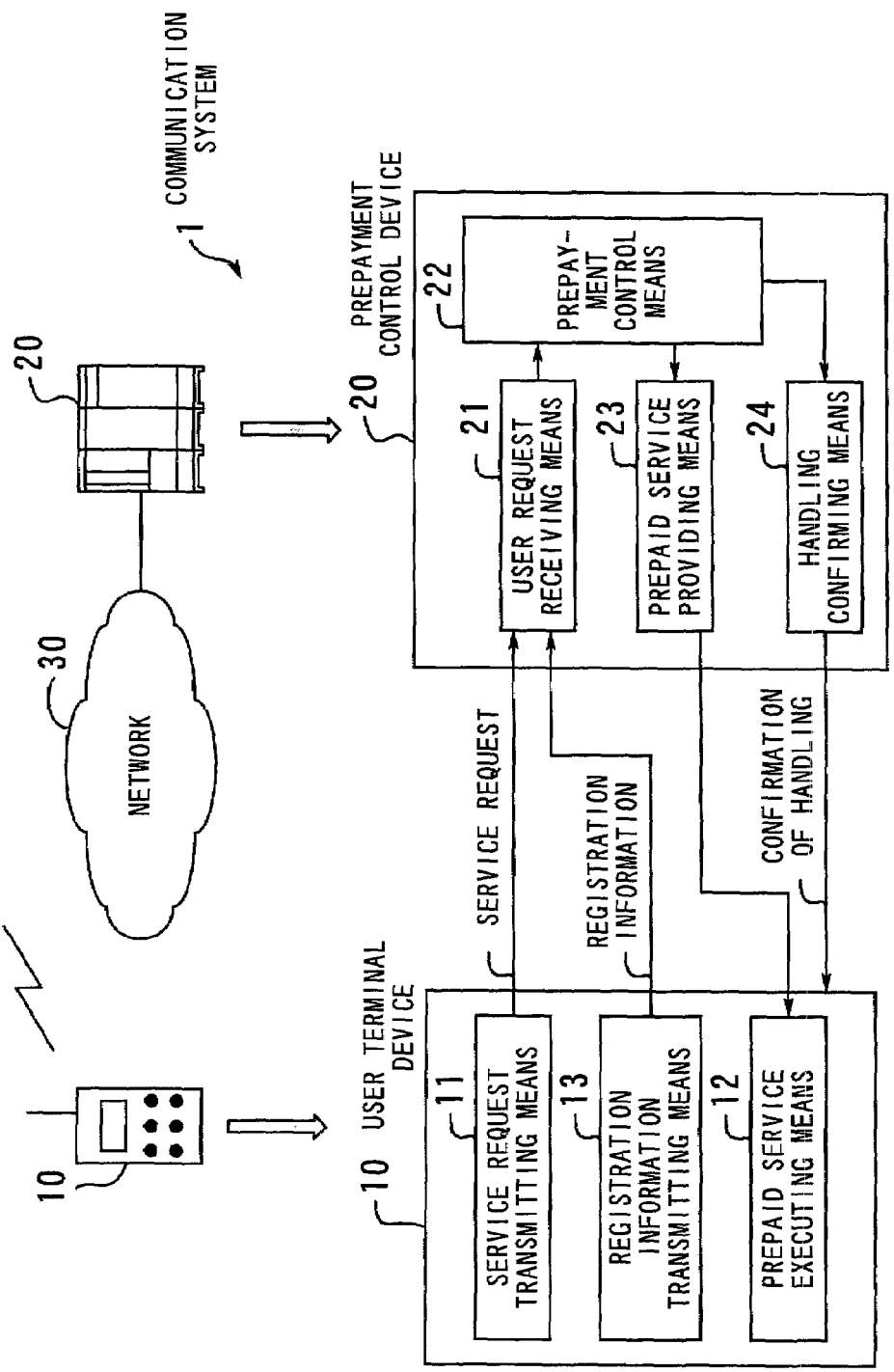
FIG. 1 is a diagram illustrating the principle of a communication system according to the present invention.

Embodiments of the present invention will be hereinafter described with reference to the drawings. FIG. 1 illustrates the principle of a communication system according to the present invention. The communication system 1 includes a user terminal device 10 and a prepayment control device 20 and provides prepaid communication services over a network 30 (including a voice network and a packet network).

In the user terminal device 10, service request transmitting means 11 transmits a prepaid service request (request for connection or disconnection with respect to a prepaid service). Prepaid service executing means 12 executes the prepaid service provided thereto.

Registration information transmitting means 13 transmits registration information for executing the prepaid service. The registration information is information which the user can register at the time of using a prepaid service, and includes, for example, setting information about the allotting of balance (prepaid amount), as described in detail later.

In the prepayment control device 20, user request receiving means 21 receives the service request and the registration information. Prepayment control means 22 performs prepayment control over all prepaid services. The prepayment control includes a process of allotting the balance of a prepayment to a plurality of prepaid services (multi prepaid services) to be conducted simultaneously, in accordance with the service request and the registration information.

According to the present invention, allotments of the balance are calculated each time a prepaid service is started or disconnected such that the balance is allotted equally to prepaid services to be executed.

Prepaid service providing means 23 provides the prepaid service in accordance with a share of the balance allotted thereto. Handling confirming means 24 transmits a notification of confirmation as to service handling (sends an alarm sound) to the user terminal device 10 immediately before the user uses up the balance.

Figure 2:
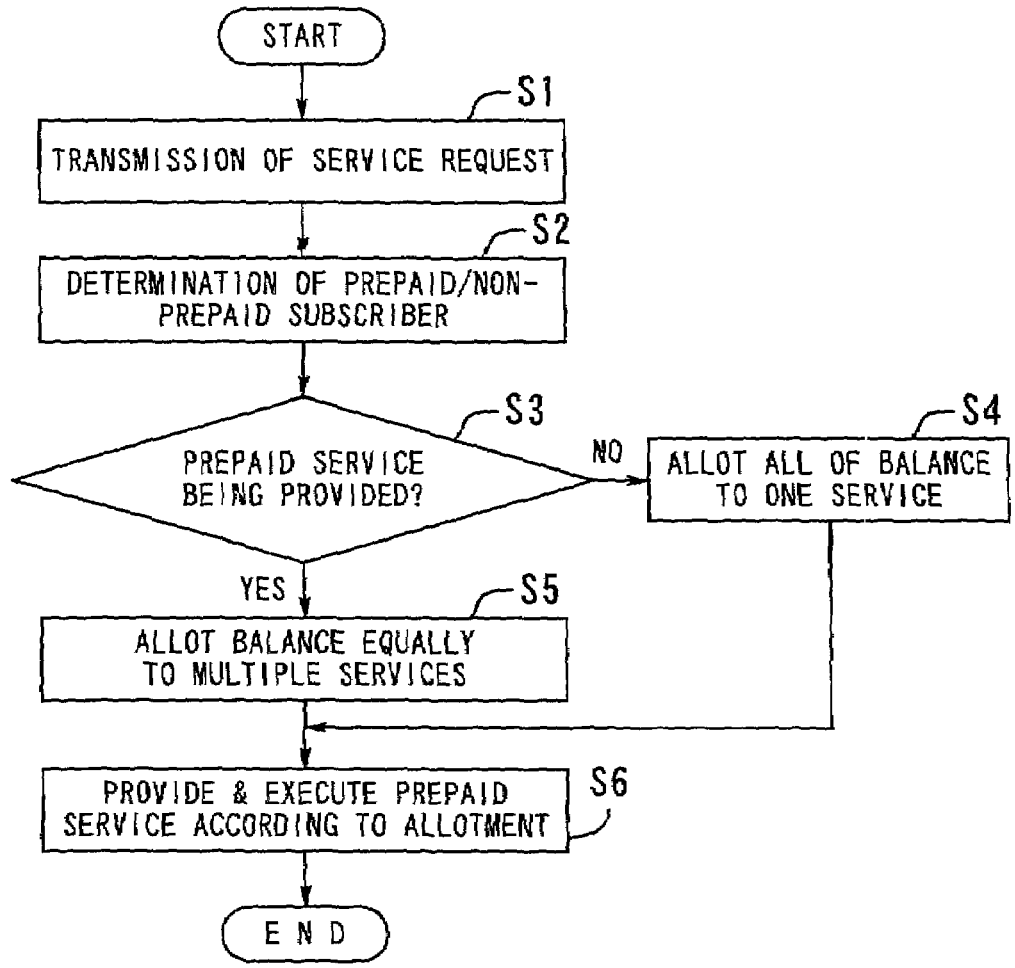
FIG. 2 is a flowchart illustrating operation according to a first embodiment.

A first embodiment of the present invention will be now described. FIG. 2 is a flowchart illustrating operation according to the first embodiment.

[S1] The service request transmitting means 11 transmits a service connection request.

[S2] On receiving the service connection request, the user request receiving means 21 checks subscriber's profile to determine whether or not the user is a prepaid subscriber. If the user is a prepaid subscriber, he/she is allowed to use the prepaid service, and if not, he/she is not permitted to use the prepaid service.

[S3] The prepayment control means 22 determines whether or not the user, who has been found to be a prepaid subscriber, is currently receiving another prepaid service. If the user is not receiving another prepaid service, the flow proceeds to Step S4; if the user is currently receiving another prepaid service, the flow proceeds to Step S5.

[S4] The prepayment control means 22 allots all of the balance to the requested prepaid service, and the flow then proceeds to Step S6.

[S5] The prepayment control means 22 performs recalculation such that the balance is allotted equally to the individual prepaid services.

[S6] The prepaid service providing means 23 provides the prepaid service in accordance with a corresponding allotment of the balance, and the prepaid service executing means 12 executes the thus-provided prepaid service.

The following explains how the balance is allotted in the case where a packet service is requested while a voice service is already being conducted, for example. Where a service request for packet communication is additionally made, the balance then allotted solely to the ongoing voice service is reallotted equally to the individual services, that is, the voice service and the packet service, without disconnecting the ongoing voice service.

For example, if the balance allotted to the voice service when a service request for packet communication is made is ¥1000, ¥500 is allotted to each of the voice and packet services, and the two services are then executed in accordance with their respective allotments.

The balance is reallotted also when one or more services are disconnected while a plurality of prepaid services are executed. Let it be assumed that while voice and packet services are executed, the voice service is disconnected.

For example, if the allotments remaining for the voice and packet services are ¥600 and ¥300, respectively, at the time a request for disconnection of the voice service is made, the prepayment control means 22 recalculates the balance and allots ¥900 to the packet service. The packet service is continuously executed thereafter in accordance with the recalculated allotment.

Figure 3:
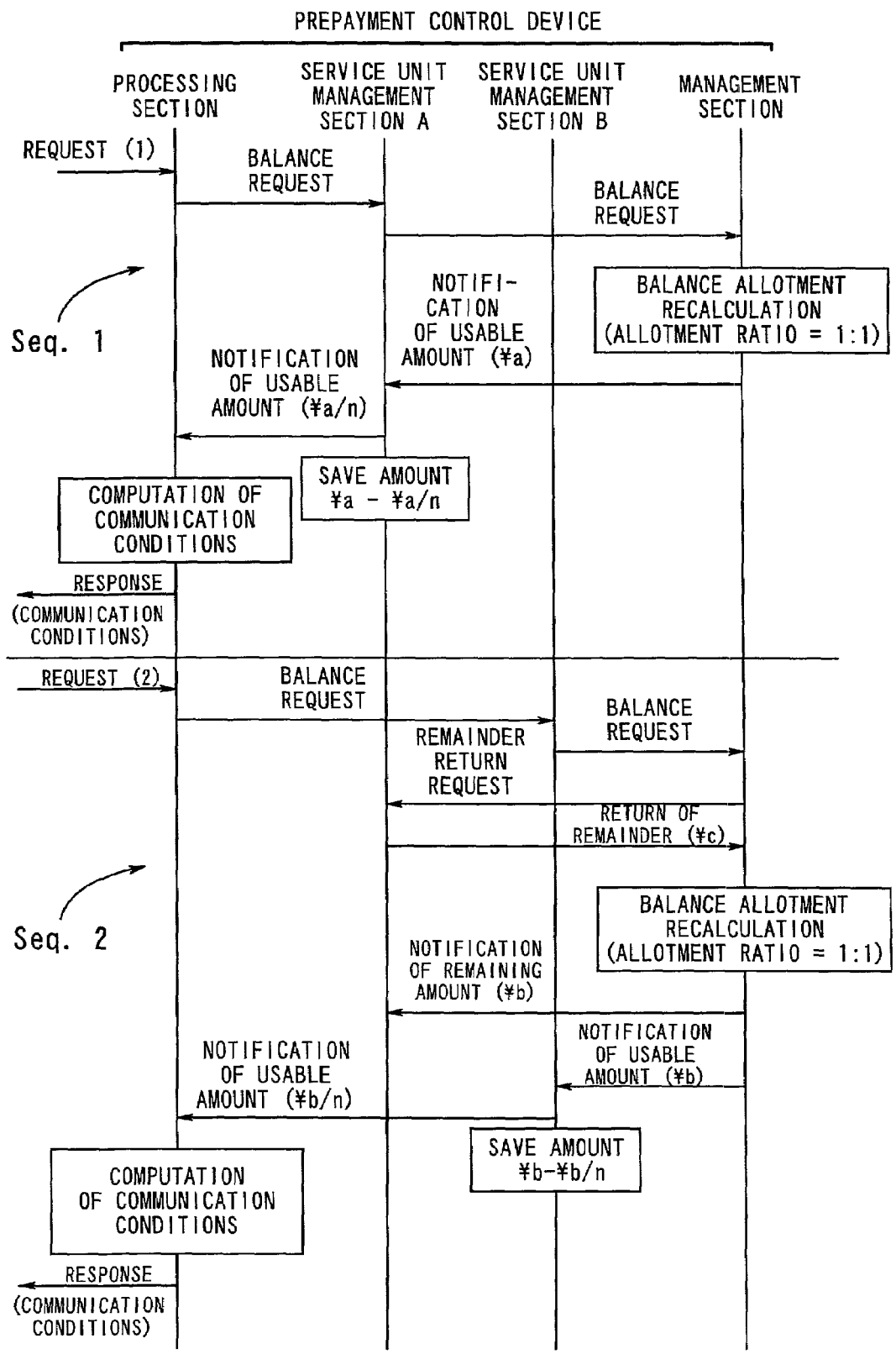
FIG. 3 is a chart illustrating operation sequences.
Figure 4:
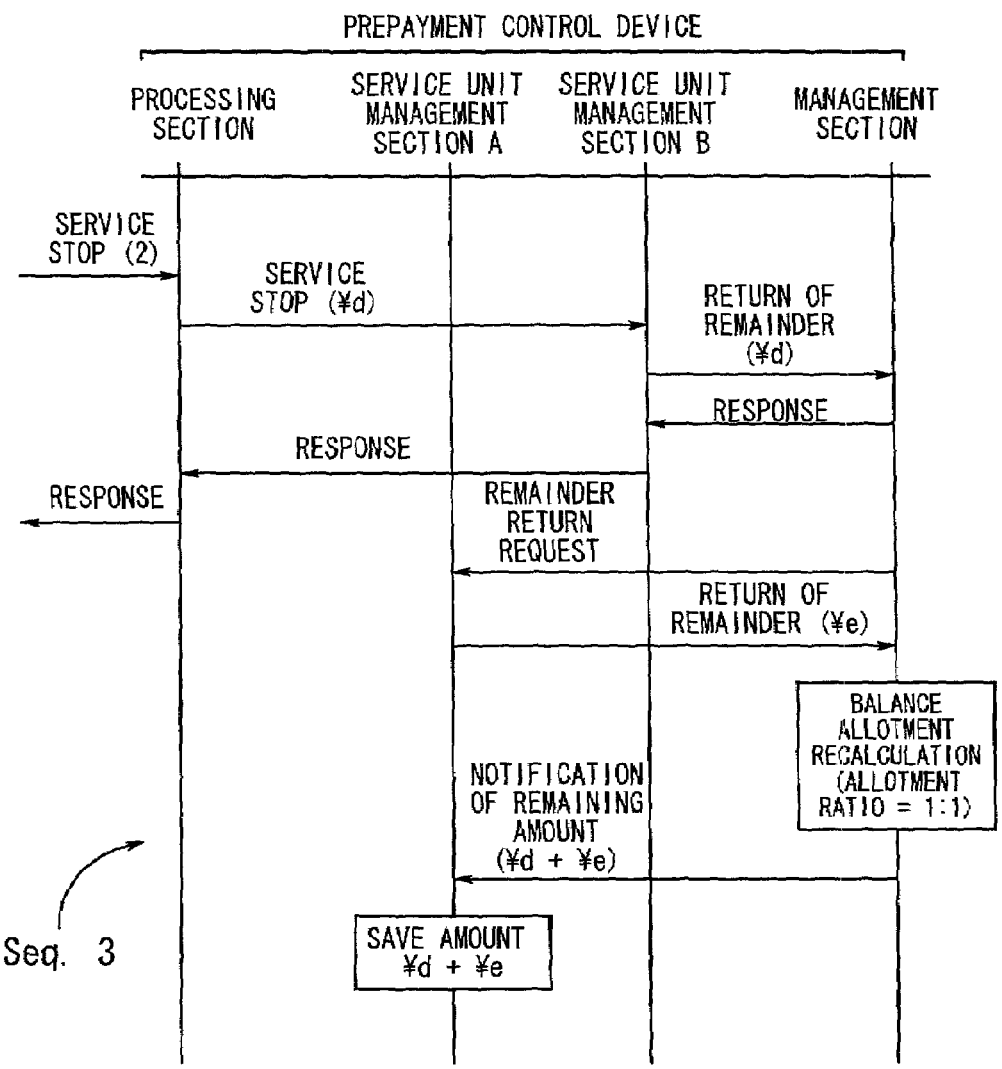
FIG. 4 is a chart also illustrating an operation sequence.

Operation according to the first embodiment will be now described with reference to the sequence diagrams of FIGS. 3 and 4. The figures illustrate operation sequences wherein, in order to permit multi-connection, the balance is reallotted equally to multiple connections whenever necessary.

In the following description, a processing section represents a block including the functions of the user request receiving means 21, prepaid service providing means 23 and handling confirming means 24, and service unit management sections (control sections each associated with one unit of prepaid service) and a management section (global control section) represent blocks including the function of the prepayment control means 22.

[Seq. 1] On receiving a request from the user (user terminal device), the processing section sends a balance request to the service unit management section A, which then sends a balance request to the management section. The management section performs a recalculation for allotting the balance (allotment ratio=1:1) and notifies the service unit management section A of a usable amount (¥a). The service unit management section A notifies the processing section of a usable amount (¥a/n:¥a is divided by n to obtain a first usable amount), and also saves an amount (¥a−¥a/n). The processing section computes communication conditions and notifies the user of the results as a response.

[Seq. 2] On receiving a request from the user (while a prepaid service is already being executed by the service unit management section A), the processing section sends a balance request to the service unit management section B, which in turn sends a balance request to the management section. The management section sends a remainder return request to the service unit management section A, to have a remainder (¥c) returned from the service unit management section A. Then, the management section again performs a calculation for allotting the balance (allotment ratio=1:1) and notifies the service unit management section A of a remaining amount (¥b) as well as the service unit management section B of a usable amount (¥b). The service unit management section B notifies the processing section of a usable amount (¥b/n) and also saves an amount (¥b−¥b/n). The processing section computes communication conditions and notifies the user of the results as a response.

[Seq. 3] On receiving a service stop request (request to stop the prepaid service conducted by the service unit management section B) from the user, the processing section sends a service stop to the service unit management section B. The service unit management section B returns a remainder (¥d) to the management section, whereupon the management section sends a response thereto to the service unit management section B as well as to the user via the processing section. Also, the management section sends a remainder return request to the service unit management section A, which then returns a remainder (¥e) to the management section. The management section again performs a calculation for allotting the balance and notifies the service unit management section A of a remaining amount (¥d+¥e), and the service unit management section A saves the amount (¥d+¥e).

Figure 5:
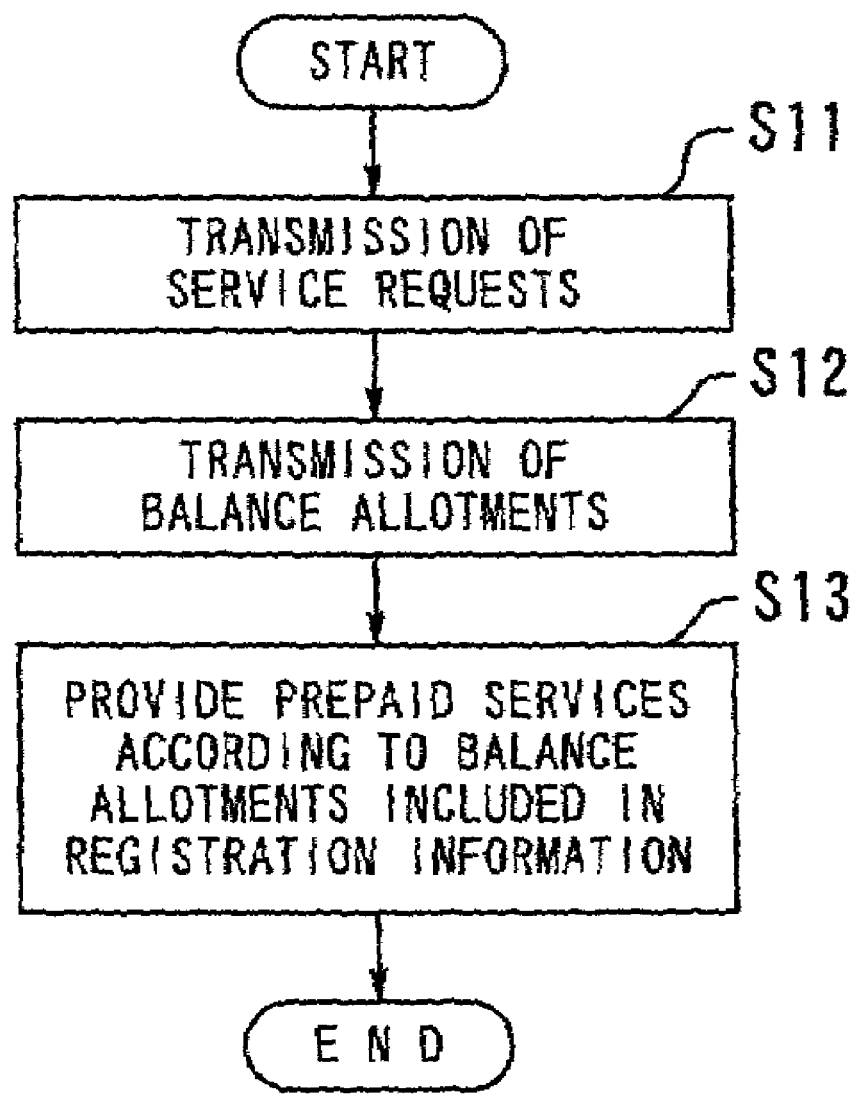
FIG. 5 is a flowchart illustrating operation according to a second embodiment.

A second embodiment of the present invention will be now described. FIG. 5 is a flowchart illustrating operation according to the second embodiment. In the following, it is assumed that two prepaid services, that is, voice and packet services, are conducted.

[S11] The service request transmitting means 11 transmits connection requests for the voice and packet services.

[S12] The registration information transmitting means 13 transmits allotments of the balance as the registration information. For example, if the amount usable for prepaid services is ¥1000, the user transmits in advance registration information that ¥400 and ¥600 should be allotted to the voice and packet services, respectively.

[S13] The prepayment control means 22 acknowledges the registration information including the allotments of the balance. Then, in accordance with the allotments specified by the user, the prepaid service providing means 23 provides the prepaid services.

In the foregoing, amounts of money are specified in the registration information as the balance allotments, but an allotment ratio may be specified instead (e.g., the allotments may be specified in a manner such that 40% and 60% of the balance are allotted to the voice and packet services, respectively, or that the voice service, packet service and other services are in an allotment ratio of 2:1:1). Also, the registration information may include a notification of increment of the balance or service priority, allotment settings in terms of the number of packets or communication time, etc.

Figure 6:
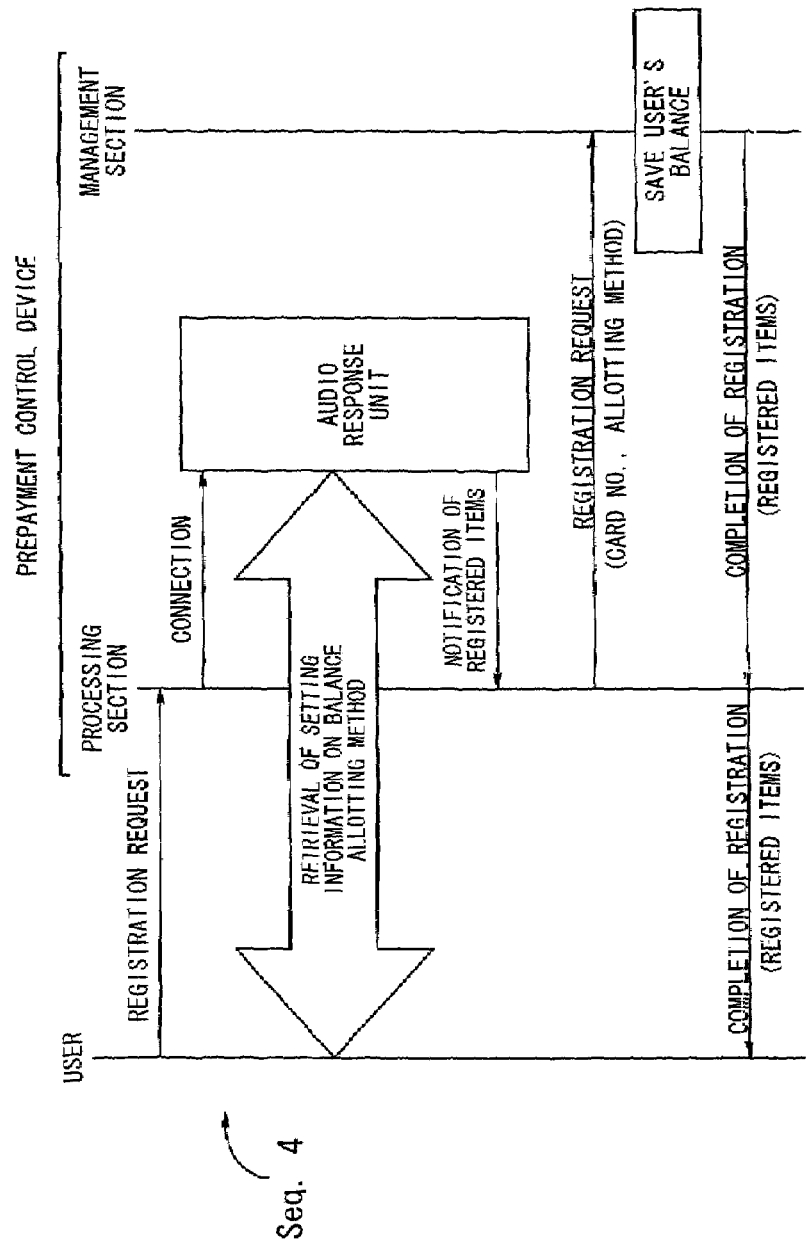
FIG. 6 is a chart illustrating an operation sequence.

FIG. 6 illustrates an operation sequence for registering a card number (including a balance allotting method etc.) of a card used exclusively for prepaid services.

[Seq. 4] The user makes a registration request to the processing section, whereupon the processing section establishes connection with an audio response unit. Following the guidance of the audio response unit, the user registers the card number, balance allotting method, etc., and the audio response unit notifies the processing section of registered items. The processing section sends a registration request to the management section. After saving the user's balance, the management section sends a completion-of-registration to the processing section, which in turn sends a completion-of-registration to the user.

Figure 7:
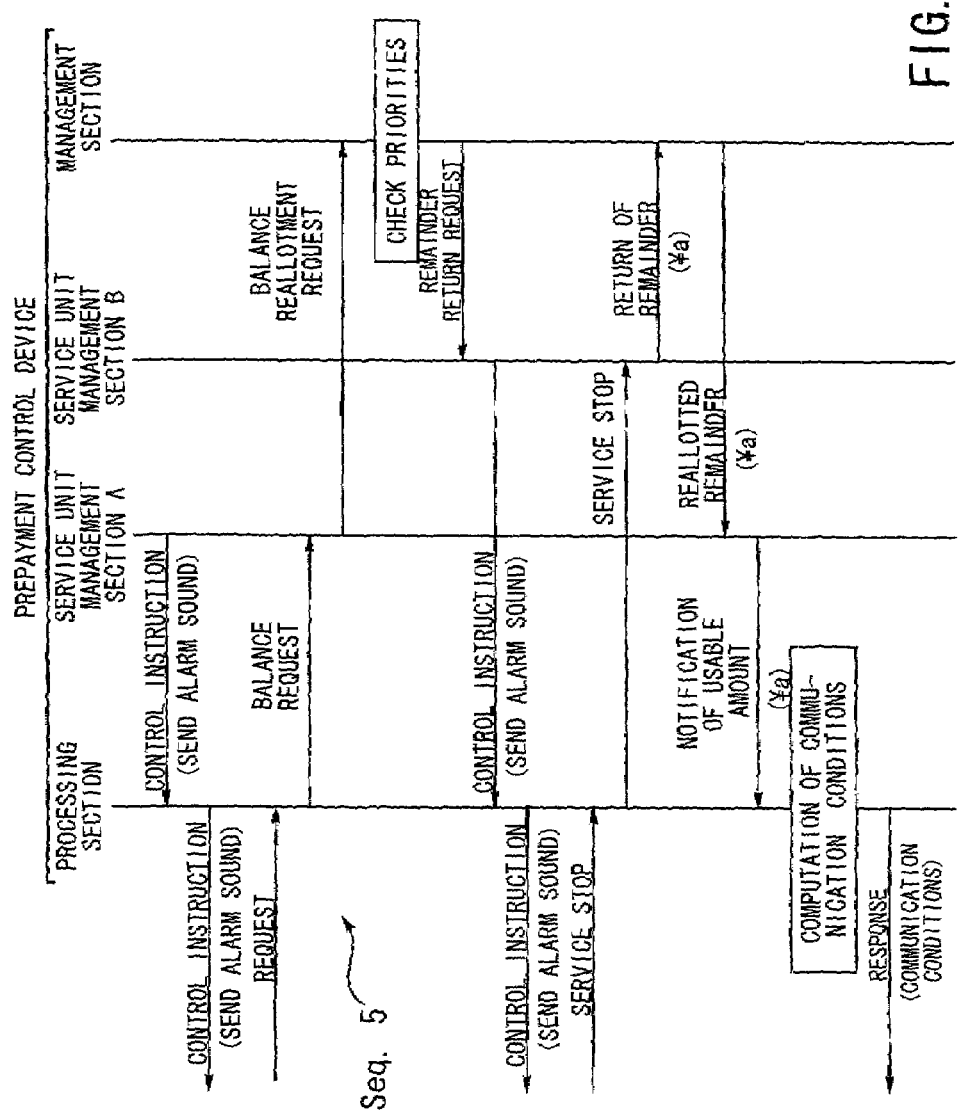
FIG. 7 is a chart also illustrating an operation sequence.

FIG. 7 illustrates an operation sequence wherein, when the remaining amount has become equal to or smaller than a fixed amount, only a high-priority connection registered in advance (at the time of registration for prepaid services) is continued.

[Seq. 5] The service unit management section A sends an alarm sound to the processing-section, which in turn sends an alarm sound to the user. The user makes an increment request, whereupon the processing section sends an increment balance request to the service unit management section A, which then sends a balance reallotment request to the management section. The management section checks the priorities (assumption is made here that the service executed by the service unit management section A has higher priority), and sends a remainder return request to the service unit management section B. The service unit management section B sends an alarm sound to the processing section, which in turn sends an alarm sound to the user. The user sends to the processing section a request to stop the service executed by the service unit management section B, whereupon the processing section sends a service stop to the service unit management section B. The service unit management section B returns a remainder (¥a) to the management section, which then reallots the remainder (¥a) to the service unit management section A. The service unit management section A notifies the processing section of a usable amount (¥a), whereupon the processing section computes communication conditions and notifies the user of the results as a response.

Figure 8:
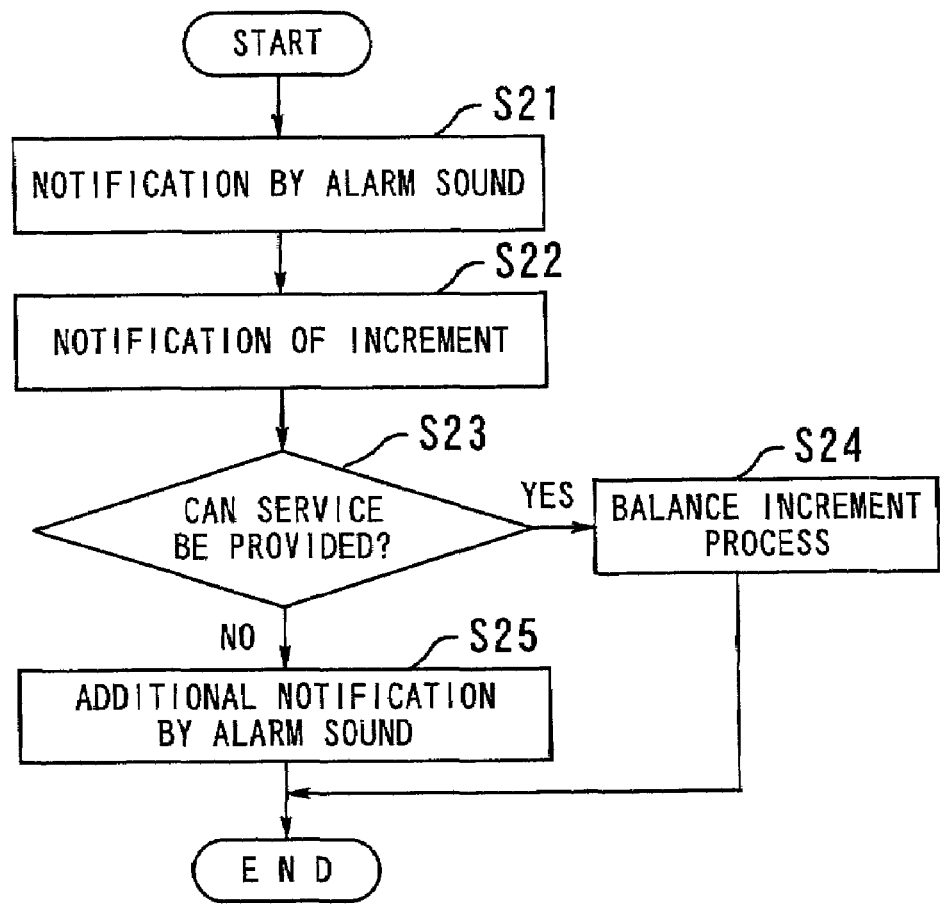
FIG. 8 is a flowchart illustrating operation according to a third embodiment.

A third embodiment will be now described. FIG. 8 is a flowchart illustrating operation according to the third embodiment. In the following, it is assumed that prepaid service is already being provided.

[S21] During provision of the service, the handling confirming means 24 notifies the user by an alarm sound or the like that the balance is running short, immediately before the set amount is used up (threshold is determined beforehand).

[S22] If the user wishes to increment the amount, he/she performs a special subscriber's operation (unit of increment is set beforehand at the time of off-line or on-line registration), whereupon the registration information transmitting means 13 notifies the corresponding prepaid service that the amount has been incremented.

[S23] The prepayment control means 22 checks the balance in accordance with the increment request to determine whether or not the service can be provided. If the service can be provided, the flow proceeds to Step S24; if not, the flow proceeds to Step S25.

[S24] The prepayment control means 22 performs a balance increment process.

[S25] The handling confirming means 24 again sends an alarm sound to the user. When an alarm sound is received again, the user must stop the service concerned or disconnect some other service.

Figure 9:
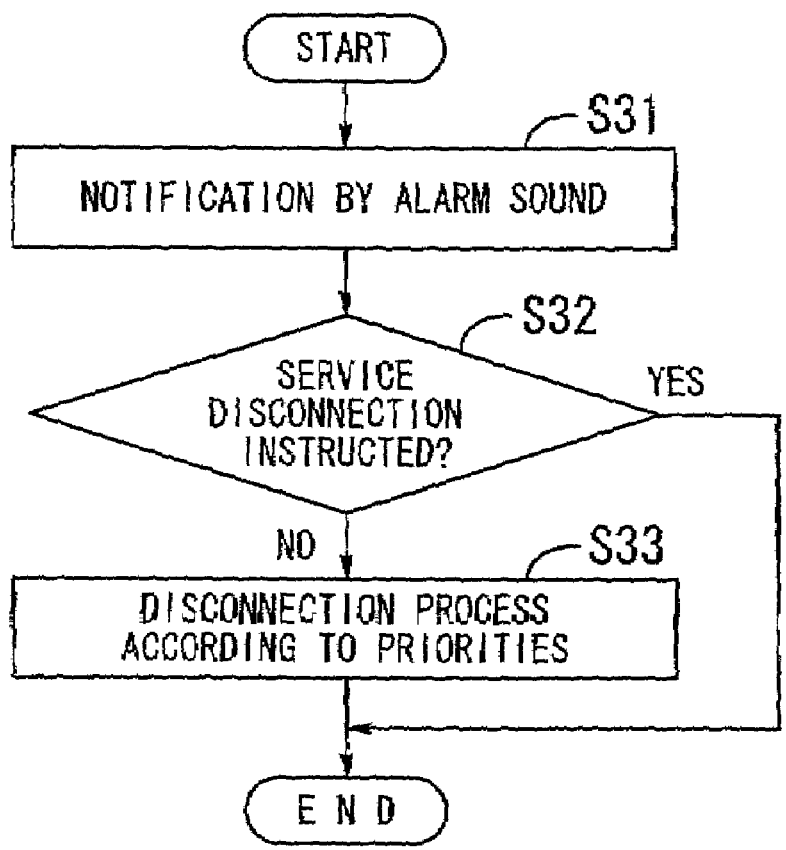
FIG. 9 is a flowchart illustrating operation according to a fourth embodiment.

A fourth embodiment will be now described. FIG. 9 is a flowchart illustrating operation according to the fourth embodiment. In the following, it is assumed that prepaid services are already being provided.

[S31] During provision of the services, the handling confirming means 24 notifies the user by an alarm sound or the like that the balance is running short, immediately before the set amount is used up.

[S32] On the user terminal device 10, service disconnection or service continuation is conducted. If service disconnection is conducted, the process is ended; if not, the flow proceeds to Step S33.

[S33] If no disconnection request has been made, the prepayment control means 22 continues providing the service with higher priority while disconnects lower-priority service, in accordance with the priorities registered in advance.

Let it be assumed here that voice and packet services are under execution and that information indicating that the packet service is higher in priority than the voice service is registered beforehand by the registration information transmitting means 13.

Where an alarm sound has been sent with respect to the voice service, the voice service is disconnected as soon as the remaining allotment becomes zero. On the other hand, in the case of sending an alarm sound with respect to the packet service, the voice service is disconnected as soon as the alarm sound is sent, and the amount saved because of the disconnection of the voice service is appropriated to the packet service to continue the packet service.

Figure 10:
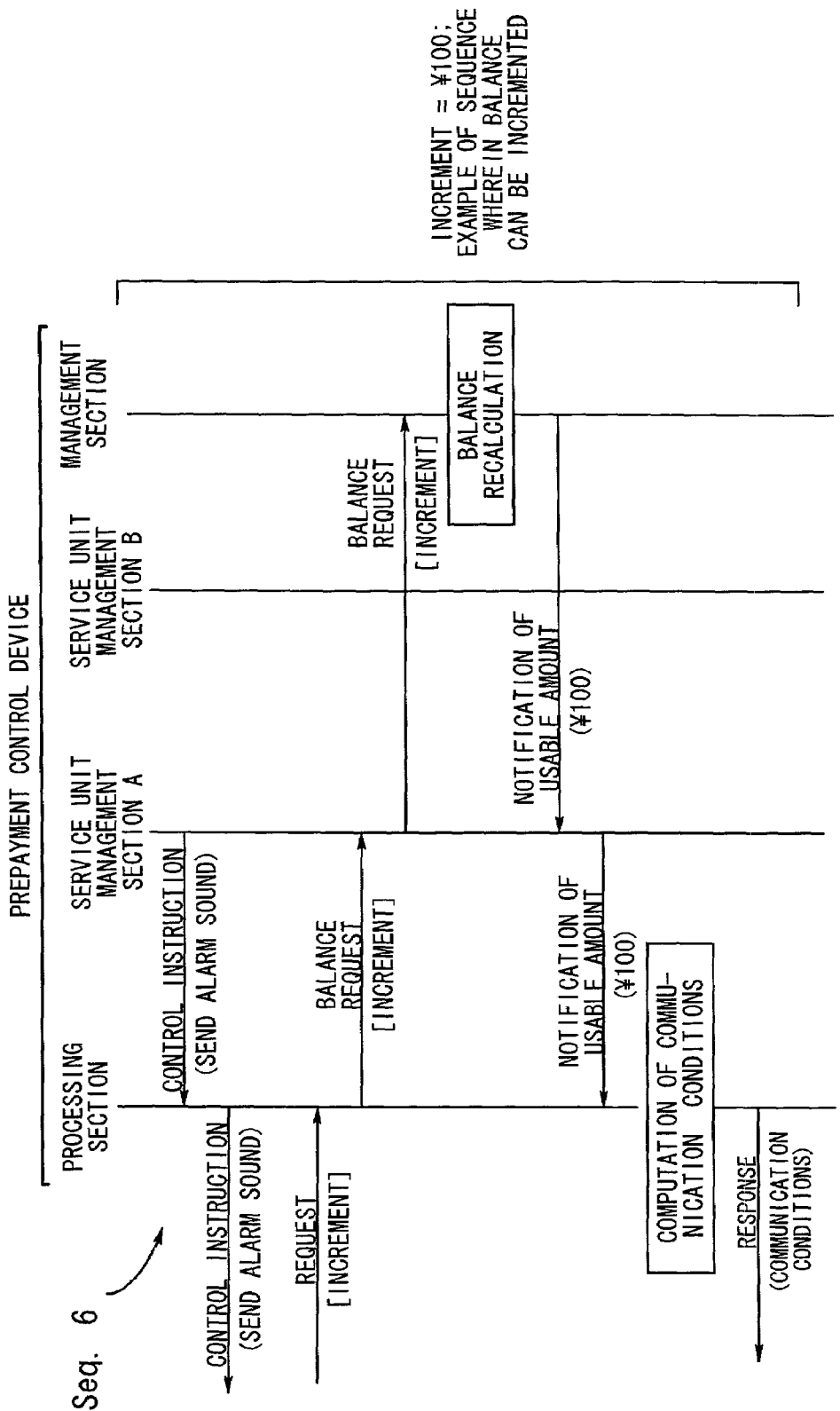
FIG. 10 is a chart illustrating an operation sequence.
Figure 11:
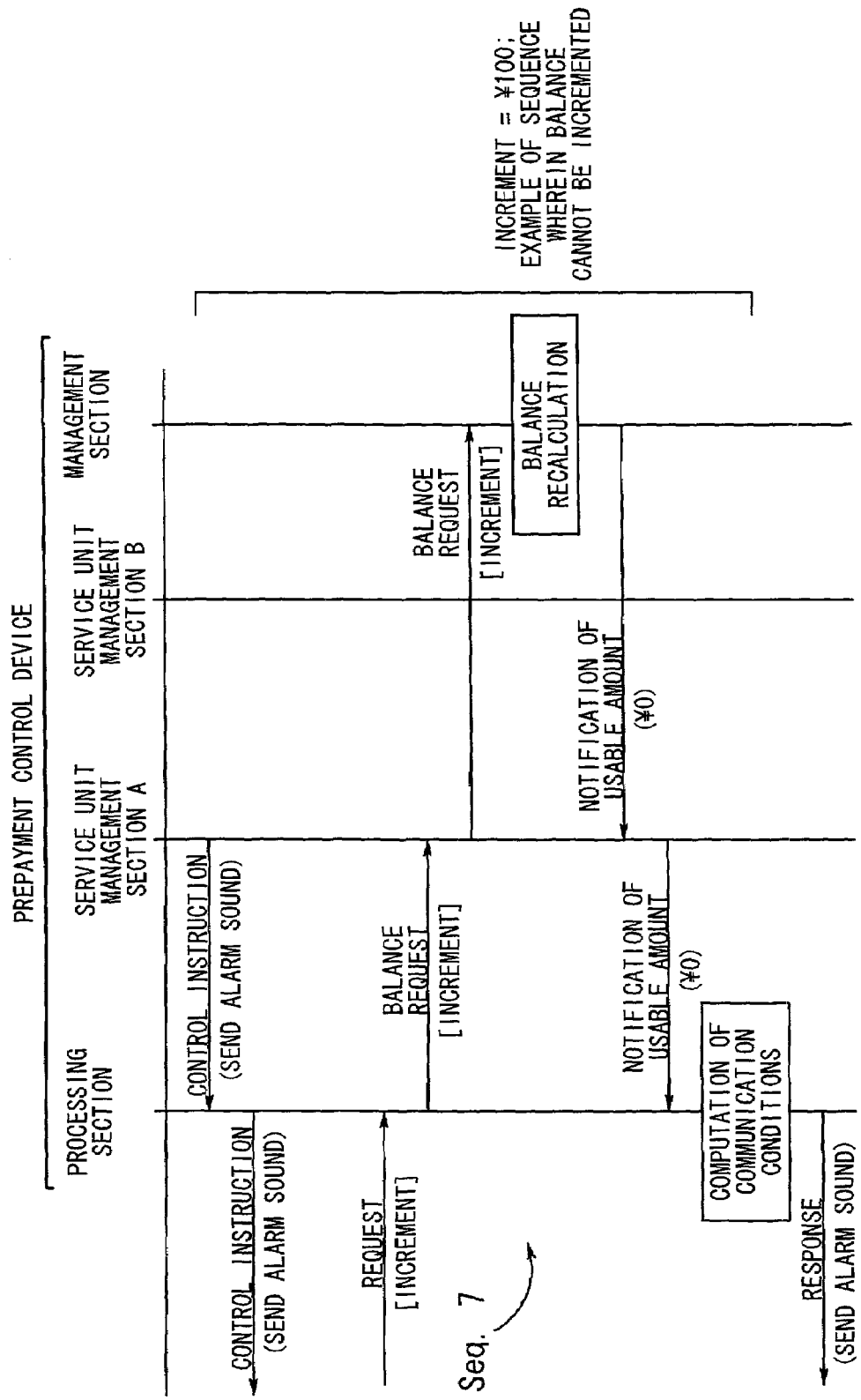
FIG. 11 is a chart also illustrating an operation sequence.

FIGS. 10 and 11 illustrate operation sequences wherein control for handling of a target connection service is performed from the network side. Seq. 6 illustrates a sequence in which the balance can be incremented by ¥100, and Seq. 7 illustrates a sequence in which an increment of ¥100 is not permitted.

[Seq. 6] The service unit management section A sends an alarm sound to the processing section, which in turn sends an alarm sound to the user. The user makes an increment request, whereupon the processing section sends an increment balance request to the service unit management section A, which then sends a balance request to the management section. The management section recalculates the balance and notifies the service unit management section A of a usable amount (¥100). The service unit management section A notifies the processing section of the usable amount, and the processing section computes communication conditions and notifies the user of the results as a response.

[Seq. 7] The service unit management section A sends an alarm sound to the processing section, which in turn sends an alarm sound to the user. The user makes an increment request, whereupon the processing section sends an increment balance request to the service unit management section A, which then sends a balance request to the management section. The management section recalculates the balance and notifies the service unit management section A of a usable amount (¥0). The service unit management section A notifies the processing section of the usable amount, and the processing section computes communication conditions and notifies the user of the results as a response (additional notification by alarm sound).

A fifth embodiment will be now described. In the first to fourth embodiments, the user has already subscribed to prepaid service and the description is directed to various controls performed to conduct the service. The fifth embodiment is directed to a procedure for subscription to prepaid service.

A person who wishes to subscribe to prepaid service first dials a specified telephone number and, following guidance of a VMR (audio response unit) or the like, registers the card number of a card used exclusively for the prepaid service. According to the present invention, the user request receiving means 21 thereafter assigns a password and notifies the user of the password.

Thus, a password is assigned to the user at the time of user registration, and this makes it possible to restrict provision of the service to users who are authorized to use the service. Also, the user who has been assigned a password may lend the prepaid card to another person who wishes to use the service, while letting him/her know the password, whereby the prepaid card can be used by a plurality of persons.

Figure 12:
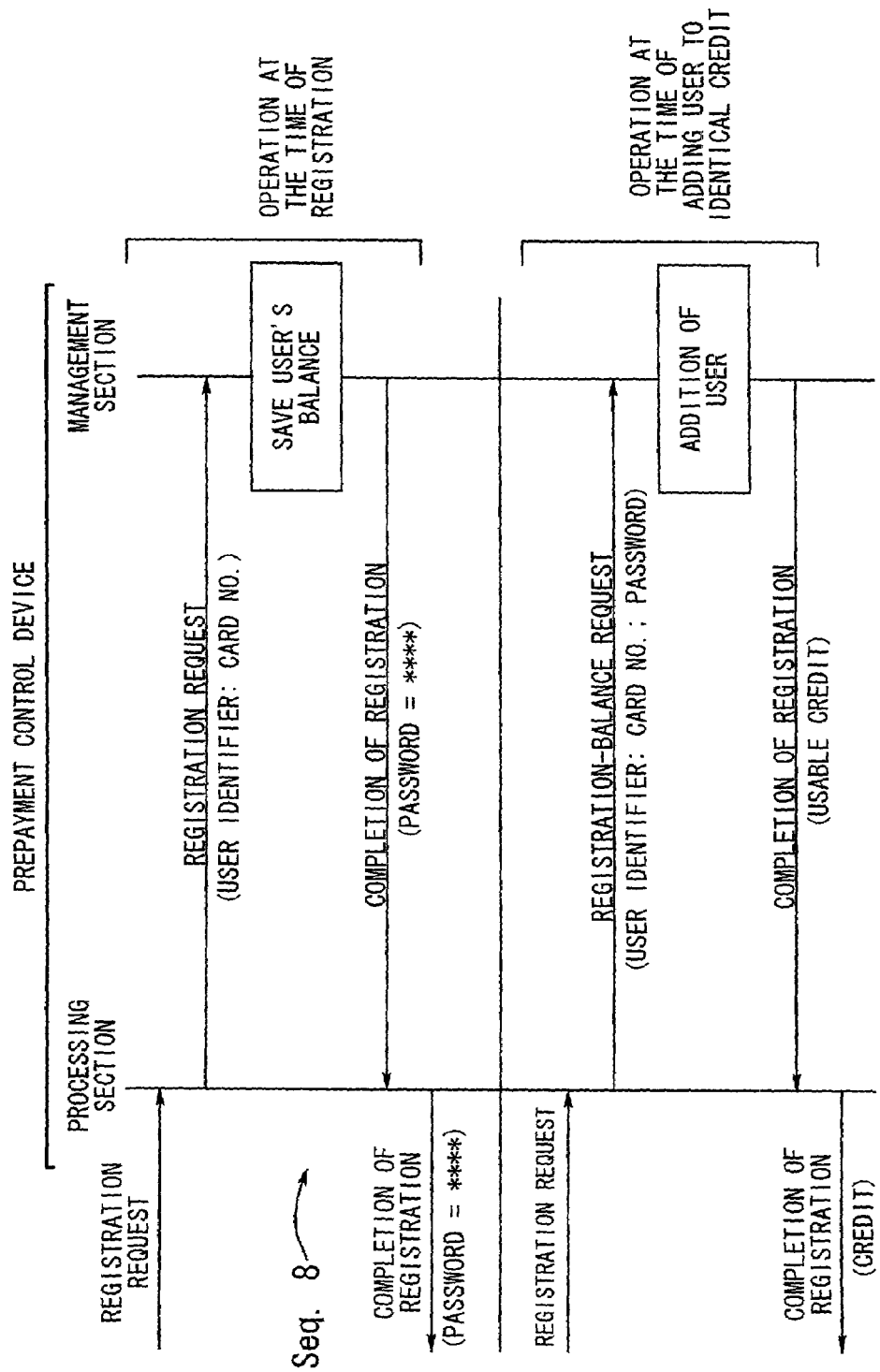
FIG. 12 is a chart illustrating an operation sequence.

FIG. 12 illustrates an operation sequence wherein a subscriber password for modification can be set at the time of prepaid service registration, and when additional registration is requested from another subscriber/terminal, the password is needed to make the service available.

[Seq. 8] At the time of registration, the user makes a registration request to the processing section, which in turn sends a registration request (including an identifier such as the card number) to the management section. After saving the user's balance, the management section sends a completion-of-registration to the processing section, which then transmits a completion-of-registration (including a password) to the user. When a user is added to the same credit, the user makes a registration request to the processing section, which in turn sends a registration-balance request (including the user identifier and the password) to the management section. The management section adds the user and sends a completion-of-registration to the processing section, whereupon the processing section transmits a completion-of-registration (usable amount) to the user.

Figure 13:
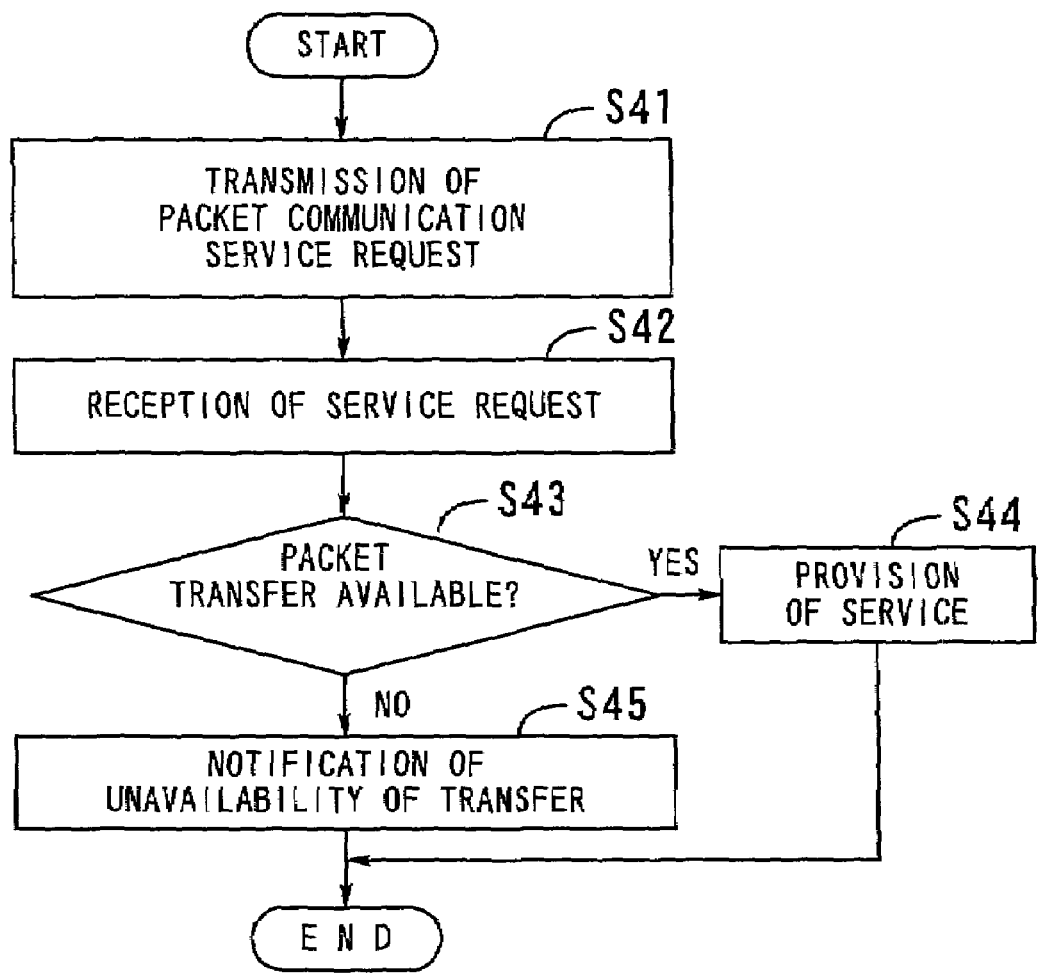
FIG. 13 is a flowchart illustrating operation according to a sixth embodiment.

A sixth embodiment will be now described. FIG. 13 is a flowchart illustrating operation according to the sixth embodiment.

[S41] The service request transmitting means 11 transmits a service connection request for packet communication.

[S42] The user request receiving means 21 receives the prepaid service connection request.

[S43] Before transferring packets, the prepayment control means 22 determines whether or not the current balance is sufficient to transfer all of the packets. If the balance is sufficient to transfer all of the packets, the flow proceeds to Step S44; if not, the flow proceeds to Step S45.

[S44] The prepaid service providing means 23 provides the prepaid packet communication service.

[S45] The handling confirming means 24 sends a notification that the current balance is insufficient to transfer the packets.

Figure 14:
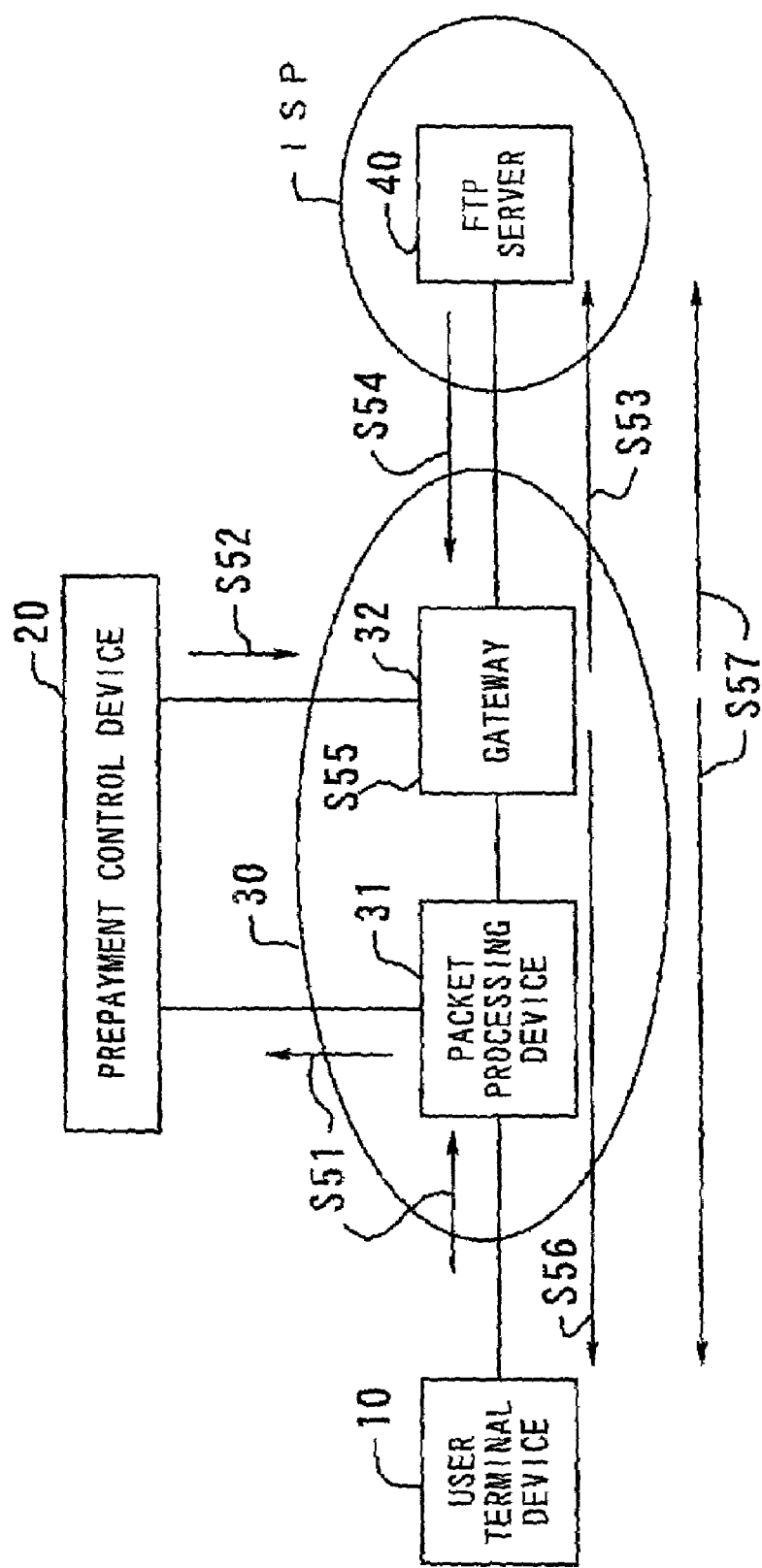
FIG. 14 is a diagram showing a system configuration in which the sixth embodiment is implemented using a gateway.

FIG. 14 shows a system configuration in which the sixth embodiment is implemented by using a gateway. The network 30 includes a packet processing device (packet exchange) 31 and a gateway 32. The user terminal device 10 is connected to the packet processing device 31, and the prepayment control device 20 is connected to the packet processing device 31 and the gateway 32. The gateway 32 is connected to an FTP (File Transfer Protocol) server 40 possessed by an ISP (Internet Service Provider).

[S51] On receiving a packet service request from the user terminal device 10, the packet processing device 31 transmits the service request to the prepayment control device 20 for access.

[S52] In the prepayment control device 20 thus accessed, the prepaid service providing means 23 transmits to the gateway 32 information about the balance of the user who has requested the packet service to be charged.

[S53] The packet processing device 31 makes a request via the gateway 32 to the FTP server 40 to transmit target packet data.

[S54] The gateway 32 receives the packet data transmitted from the FTP server 40.

[S55] In accordance with the balance information, the gateway 32 determines whether or not all of the packet data may be transferred. If all the packet data may be transferred, the flow proceeds to Step S56; if not, the flow proceeds to Step S57.

[S56] The gateway 32 transmits the packet data to the user terminal device 10 via the packet processing device 31.

[S57] The gateway 32 transmits a notification of transfer unavailability to the user terminal device 10 via the packet processing device 31, and also transmits a packet data transmission stop request to the FTEP server 40.

Figure 15:
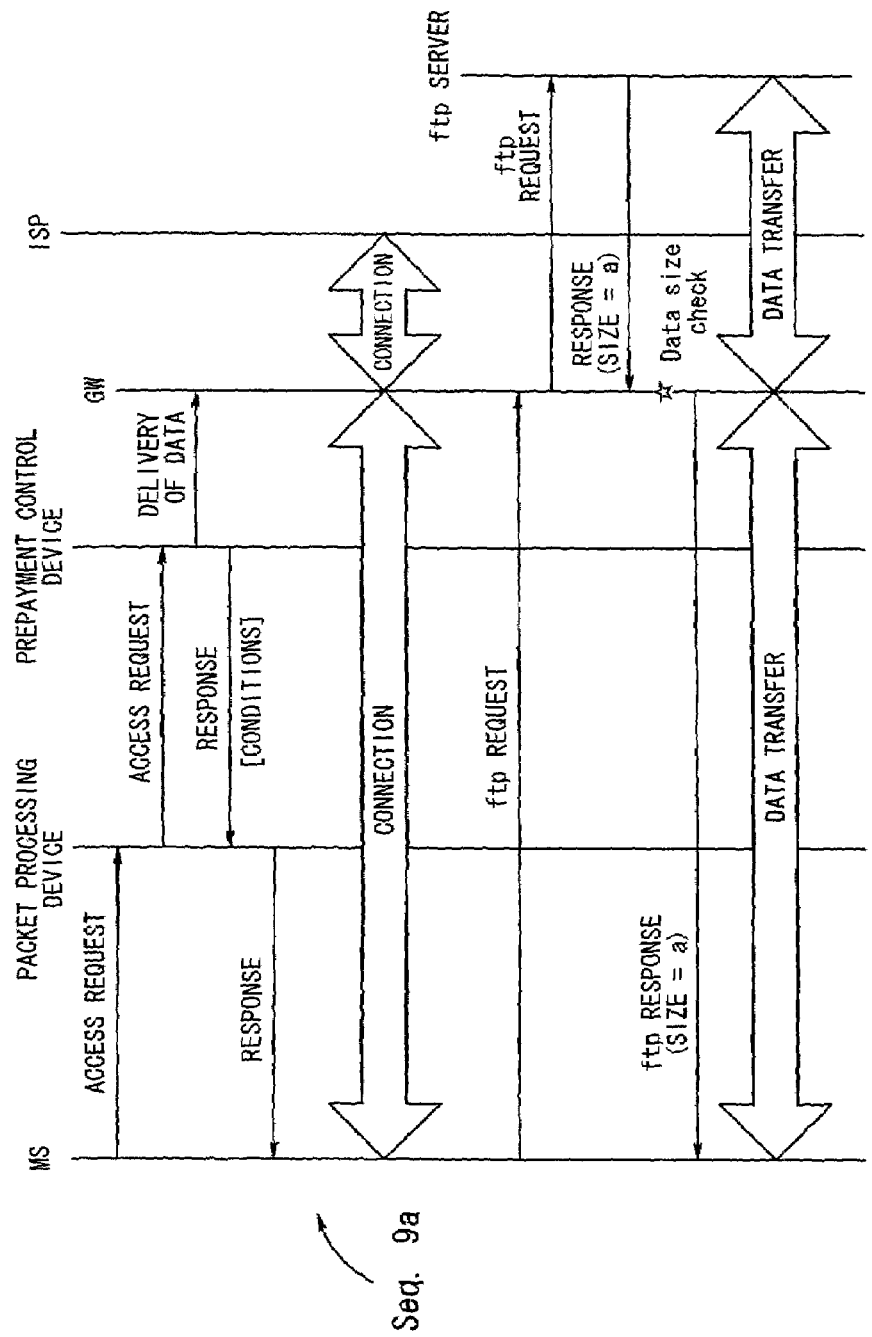
FIG. 15 is a chart illustrating an operation sequence.
Figure 16:
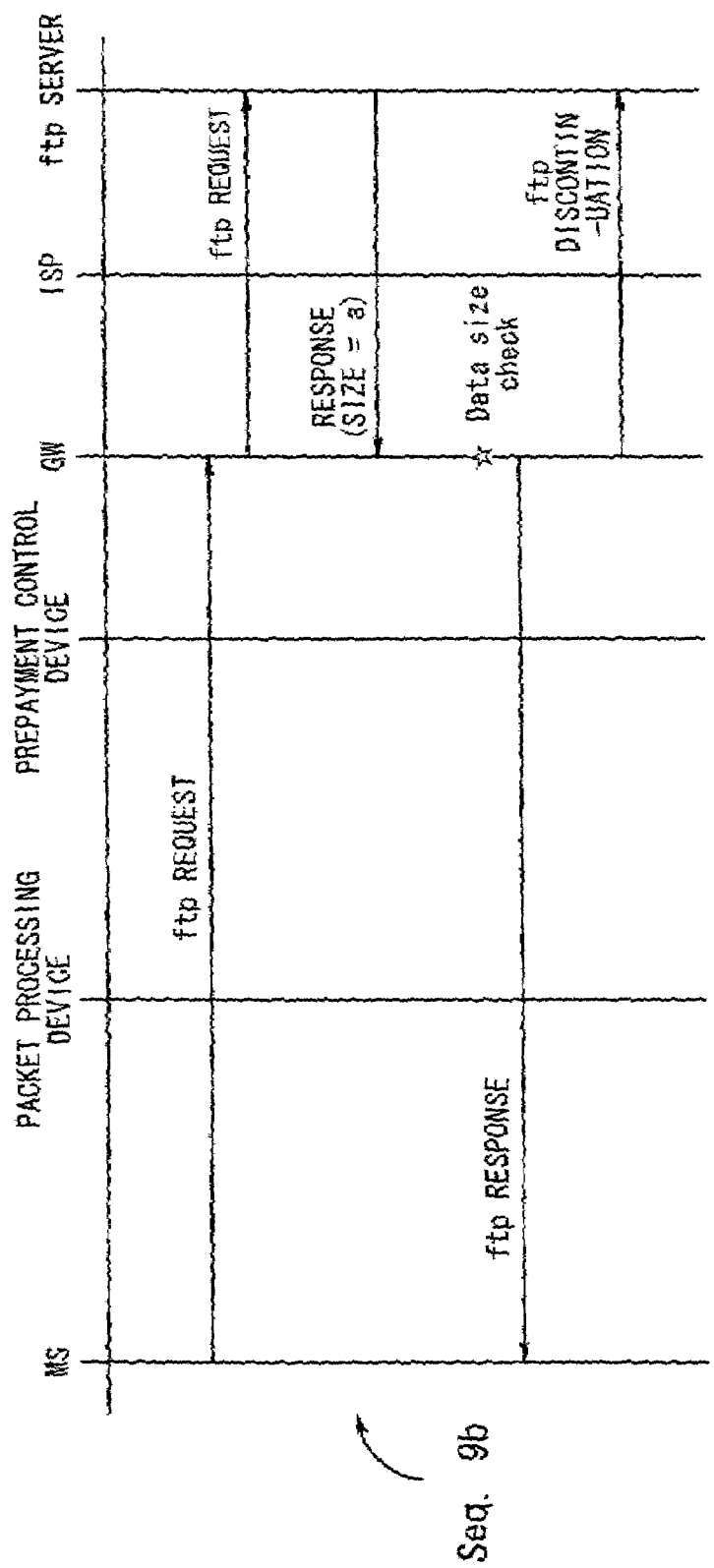
FIG. 16 is a chart also illustrating an operation sequence.

FIGS. 15 and 16 illustrate operation sequences wherein, to conduct a packet service as a prepaid service, a gateway (GW) having an FTP function and a downloaded data storage function is added to perform prepayment control, and when a data-requesting packet has been received, whether the service may be provided or not is determined based on the quantity of packets to be delivered (or the communication time required for the transfer) and the remaining amount, before the service is actually provided. Seq. 9a shows the case where the balance is sufficient to transfer data, and Seq. 9b shows the case where the balance is insufficient to transfer data.

[Seq. 9a] A user terminal device (MS) makes an access request to the packet processing device, which in turn sends an access request to the prepayment control device. The prepayment control device sends data indicating the access request to the gateway and also sends a response to the packet processing device, which then transmits a response to the user terminal device. Thereupon, the mail user terminal device and the gateway are connected to each other, and the gateway and the ISP are connected to each other. The user terminal device sends an ftp request to the gateway, which in turn sends an ftp request to the ftp server. The ftp server transmits a response (data size=a) to the gateway, whereupon the gateway checks the data size. If the current balance is sufficient to transfer all of the data, the gateway transmits an ftp response (data size=a) to the user terminal device. Subsequently, the data is transferred between the user terminal device and the gateway and between the gateway and the ftp server.

[Seq. 9b] The user terminal device transmits an ftp request to the gateway, which in turn makes an ftp request to the ftp server. The ftp server sends a response (data size=a) to the gateway, whereupon the gateway checks the data size. If the current balance is insufficient to transfer all of the data, the gateway sends an ftp response to the user terminal device and also sends an ftp discontinuation to the ftp server.

Figure 17:
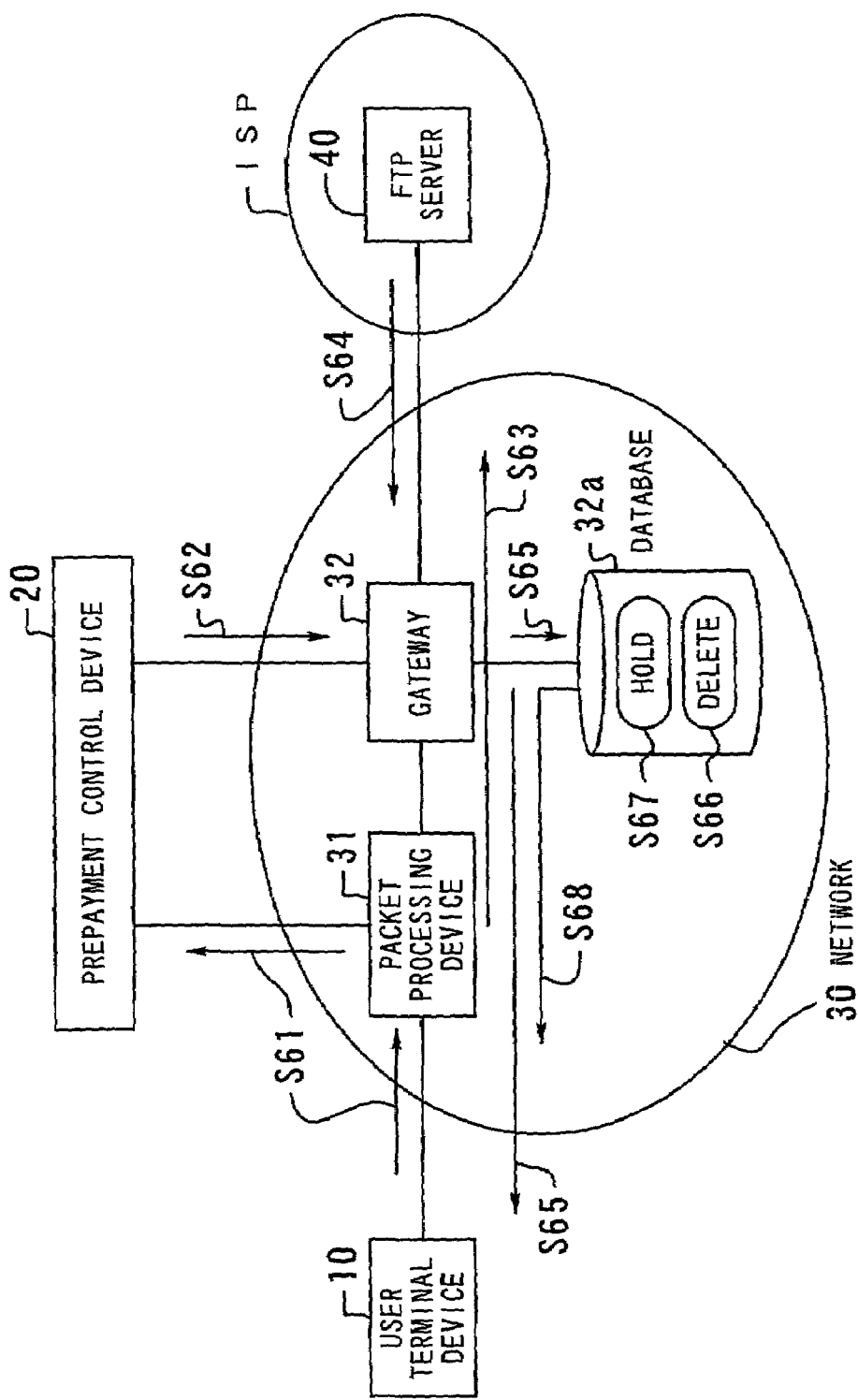
FIG. 17 is a diagram showing a system configuration to which a seventh embodiment is applied.

A seventh embodiment will be now described. FIG. 17 shows a system configuration to which the seventh embodiment is applied. In the system configuration to which the seventh embodiment is applied, the aforementioned gateway 32 is connected with a database (data storage means) 32a for storing packet data.

[S61] On receiving a packet service request from the user terminal device 10, the packet processing device 31 sends the service request to the prepayment control device 20 for access.

[S62] In the prepayment control device 20 thus accessed, the prepaid service providing means 23 transmits to the gateway 32 information about the balance of the user who has requested the packet service to be charged.

[S63] The packet processing device 31 requests, via the gateway 32, the FTP server 40 to transmit target packet data.

[S64] The gateway 32 receives the packet data transmitted from the FTP server 40.

[S65] The gateway 32 transfers the packet data downloaded from the FTP server 40 to the user terminal device 10 via the packet processing device 31. Also, simultaneously with the transfer of the packet data, the gateway 32 makes a copy of the packet data and stores the copy in the database 32a.

[S66] If the transfer of all the packet data is normally completed, the gateway 32 deletes all of the packet data held in the database 32a.

[S67] If the packet data fails to be normally transferred, the gateway 32 causes only packet data which was not transferred, to be held in the database 32a for a preset period of time.

[S68] If the user again initiates the service within the preset period, the gateway 32 fetches the remaining packet data from the database 32a and transfers the data.

Figure 18:
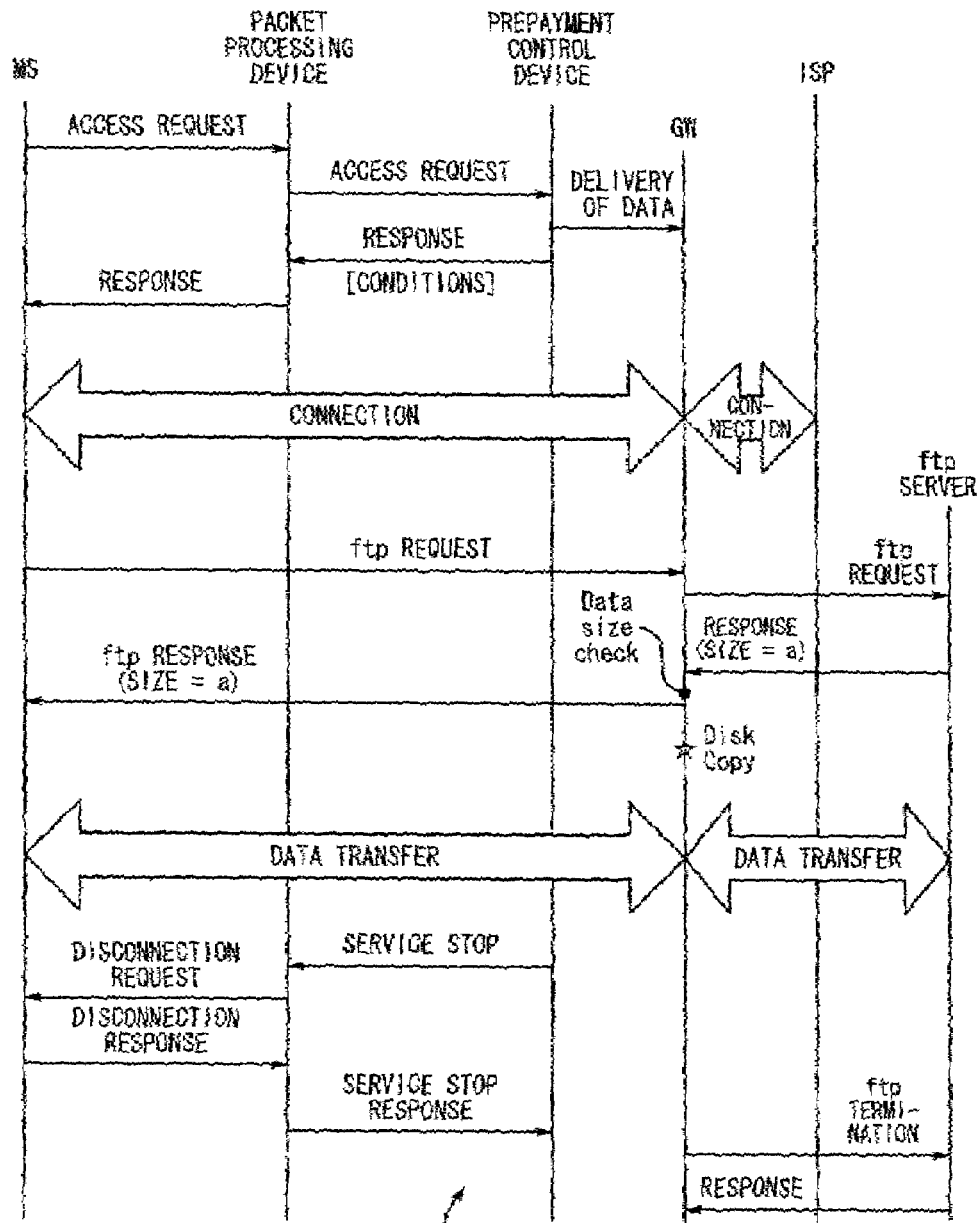
FIG. 18 is a chart illustrating an operation sequence.

FIG. 18 illustrates an operation sequence wherein, to conduct a packet service as a prepaid service, a gateway (GW) having an FTP function and a downloaded data storage function is added to perform prepayment control, and when a data-requesting packet has been received, packets are cached in a dedicated database for individual users over a fixed period of time so that even if the service is disconnected in the middle (due to no-carrier state, deficiency of the balance of prepayment, etc.), the necessary packets can be delivered without the need to again retrieve the packets.

[Seq. 10] The user terminal device (MS) makes an access request to the packet processing device, which in turn makes an access request to the prepayment control device. The prepayment control device delivers data indicating the access request to the gateway and also transmits a response to the packet processing device, which then sends a response to the user terminal device. Thereupon, the user terminal device and the gateway are connected to each other, and the gateway and the ISP are connected to each other. The user terminal device then transmits an ftp request to the gateway, which in turn sends an ftp request to the ftp server. The ftp server transmits a response (data size=a) to the gateway, whereupon the gateway checks the data size and then transmits an ftp response to the user terminal device. Subsequently, data is transferred between the user terminal device and the gateway and between the gateway and the ftp sewer. Also, at this time, the gateway makes a copy of the transferred data and stores the copy. The prepayment control device sends a service stop to the packet processing device (because of deficiency of the balance etc.), whereupon the packet processing device transmits a disconnection request to the user terminal device. The user terminal device transmits a disconnection response to the packet processing device, which in turn sends a service stop response to the prepayment control device. On the other hand, the gateway stores all of the data and then transmits an ftp termination to the ftp server, which then returns a response to the gateway.

Figure 19:
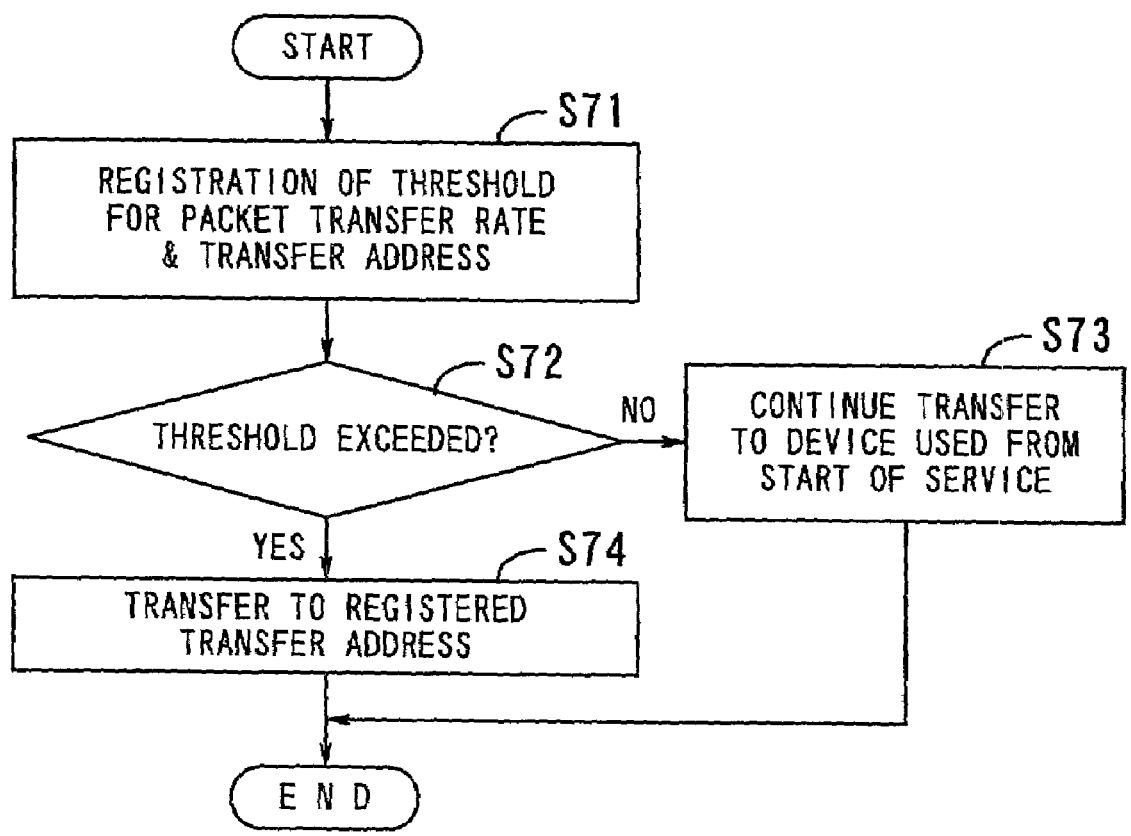
FIG. 19 is a flowchart illustrating operation according to an eighth embodiment.

An eighth embodiment will be now described. FIG. 19 is a flowchart illustrating operation according to the eighth embodiment.

[S71] When performing packet communication, the registration information transmitting means 13 transmits, as the registration information, a threshold (e.g., 2 Mb/s) for the transfer rate of packets and an address (e.g., IP address) to which the packets are transferred in the event the threshold is exceeded.

[S72] The prepayment control means 22 determines whether or not the transfer rate of packets being provided by the packet service under execution is higher than 2 Mb/s. If 2 Mb/s is not exceeded, the flow proceeds to Step S73; if 2 Mb/s is exceeded, the flow proceeds to Step S74.

[S73] The prepaid service providing means 23 continues transferring packets to the device to which packets are currently transferred. For example, if the device to which packets have been transferred from the first is a portable telephone, the packet transfer to the portable telephone is continued.

[S74] Since 2 Mb/s is exceeded, the prepayment control means 22 instructs the prepaid service providing means 23 to transfer the succeeding packet data to the registered IP address. Accordingly, the prepaid service providing means 23 transfers the packet data to the IP address.

According to the eighth embodiment, in cases where the user tries to retrieve the necessary information while surfing the net on a mobile terminal but the information is vast in quantity, for example, he/she can acquire the information later by again accessing from a different terminal (personal computer at home, etc.) connected to a fixed network.

A ninth embodiment will be now described. According to the ninth embodiment, the telecommunication carrier and a content provider make arrangements beforehand such that when the user accesses a prepaid service with a specific address (specific URL or specific IP address), the content provider is charged for the communication via the prepaid service.

For example, two servers are installed on the content provider side so that the charges for communications with servers A and B may be borne respectively by the user and the content provider. The address specific to the server B is set in the prepayment control means 22.

When a user request for access to the specific address is received from the user terminal device 10, the prepayment control means 22 recognizes the request and performs control such that content is provided to the user from the server B with respect to which the communication charge is borne by the content provider. This control makes it possible to conduct a prepaid service whereby the price of content purchasable on-line and the communication associated therewith can be charged in a lump.

Figure 20:
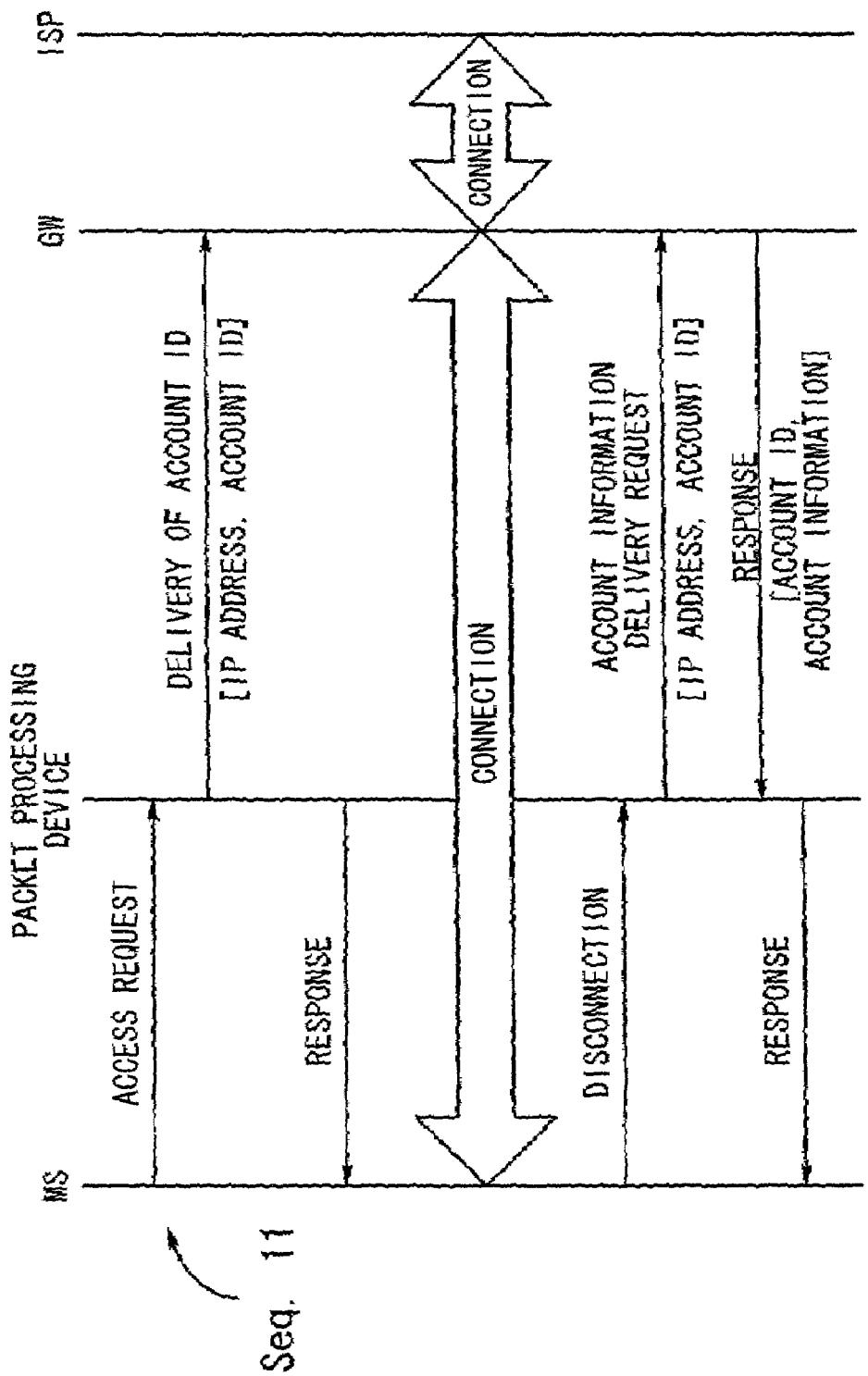
FIG. 20 is a chart illustrating an operation sequence.

FIG. 20 illustrates an operation sequence for conducting a communication charge-included prepaid download service.

[Seq. 11] The mail server transmits an access request to the packet processing device (which may alternatively be a prepayment control device having the packet processing function), and the packet processing device transmits an account ID (IP address, account ID) to the gateway. Also, the packet processing device transmits a response to the mail server. Thus, the mail server and the gateway are connected to each other, and the gateway and the ISP are connected to each other. The mail server then notifies the packet processing device of disconnection, and the packet processing device transmits an account information delivery request (IP address, account ID) to the gateway. The gateway transmits a response (account ID, account information) to the packet processing device, which in turn transmits a response to the mail server. The account information is transmitted to an accounting center where charges for communication to be borne by the user and the content provider are calculated.

As described above, in the communication system according to the present invention, allotments of the balance of prepayment are calculated based on a service request or registration information from the user so that a plurality of prepaid services can be provided simultaneously in accordance with respective allotments of the balance. This makes it possible to conduct. efficient multi prepaid service and also to improve the quality and convenience of prepaid communication service.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communication system for providing prepaid communication service over a network, comprising:
   (a) a user terminal device including:
   service request transmitting means for transmitting a service request for a prepaid service, prepaid service executing means for executing the prepaid service, and registration information transmitting means for transmitting registration information for executing the prepaid service; and
   (b) a prepayment control device including:
   user request receiving means for receiving the service request and the registration information,
   prepayment control means for performing prepayment control including a process of allotting a balance of prepayment to a plurality of the prepaid services to be conducted simultaneously, based on the service request and the registration information, and
   prepaid service providing means for providing the prepaid service in accordance with a corresponding allotment of the balance;
   wherein:
   the registration information, transmitting means transmits information about priorities of prepaid services as the registration information, and
   when an allotment for a prepaid service with high priority is running short, the prepayment control means generates an instruction to disconnect a prepaid service with low priority and recalculates allotments such that an allotment for the prepaid service with low priority is appropriated to the prepaid service with high priority.

2. A communication system for providing prepaid communication service over a network, comprising:
   (a) a user terminal device including:
   service request transmitting means for transmitting a service request for a prepaid service, prepaid service executing means for executing the prepaid service, and registration information transmitting means for transmitting registration information for executing the prepaid service; and
   (b) a prepayment control device including:
   user request receiving means for receiving the service request and the registration information,
   prepayment control means for performing prepayment control including a process of allotting a balance of prepayment to a plurality of the prepaid services to be conducted simultaneously, based on the service request and the registration information, and
   prepaid service providing means for providing the prepaid service in accordance with a corresponding allotment of the balance;
   wherein:
   when packet communication is to be performed, the registration information transmitting means transmits, as the registration information, a threshold for packer transfer rate and a transfer address to which packets are to be transferred in case the threshold is exceeded, and
   the prepayment control means determines whether or not a transfer rate of a packet service being provided becomes higher than the threshold, and generates an instruction to transfer packets to the transfer address if the threshold is exceeded.

3. A user terminal device for receiving prepaid communication service over a network, comprising:
   multi-call service request transmitting means for requesting a first prepaid service and a second prepaid service simultaneously; and
   registration information transmitting means for transmitting registration information for executing the first and second prepaid services, including setting information about allotments of a shared prepaid amount, and also including priority information indicating that the first prepaid service is to be prioritized over the second prepaid service, so that, when the allotment for the first prepaid service is running short, the second prepaid service will be disconnected and the allotment for the second prepaid service will be appropriated to the first prepaid service.

* * * * *